Sept. 9, 1958 L. J. KRANTZ 2,851,052
OIL TANK TRUCKS
Filed Oct. 15, 1956

INVENTOR.
LEONARD J. KRANTZ
BY Gerald P. Welch
ATTORNEY

United States Patent Office 2,851,052
Patented Sept. 9, 1958

2,851,052
OIL TANK TRUCKS

Leonard J. Krantz, Milwaukee, Wis.

Application October 15, 1956, Serial No. 616,049

1 Claim. (Cl. 137—267)

This invention relates to improvements in oil tank trucks, and more particularly to a novel oil tank truck of the type used for fuel oil delivery and the like.

An object of the invention is to provide a device of the type having a main gasoline tank and an auxiliary gasoline tank for the purpose of segregating tax free gasoline from the gasoline in the main tank which is used for propelling the truck along the highway and is thus subject to highway use state and federal taxes. In trucks of the type now in use, tax is paid on all of the gasoline used, and it is manifest that the gasoline utilized in pumping fuel into the tank of a heating system is not consumed during highway travel and tax refund would be in order.

Another object of the invention is to provide a device of the type which will include means for quickly and conveniently substituting the flow of gasoline from one tank for that of the other.

Other and further objects of the invention will appear as the description proceeds, reference being had to the accompanying drawing, in which.

Figure 1:
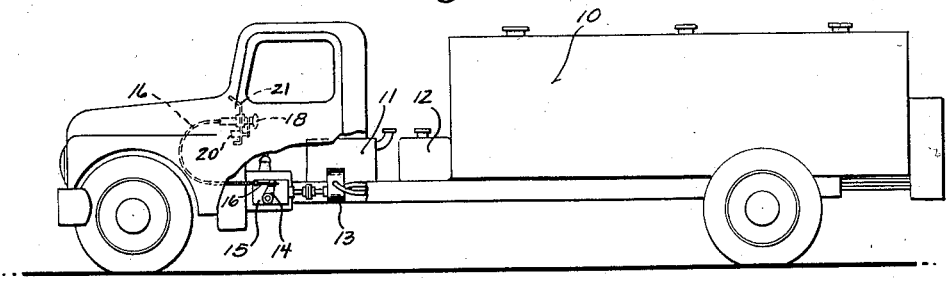
Fig. 1 is a side view in elevation of a gasoline tank arrangement on an oil tank truck embodying the invention.
Figure 2:
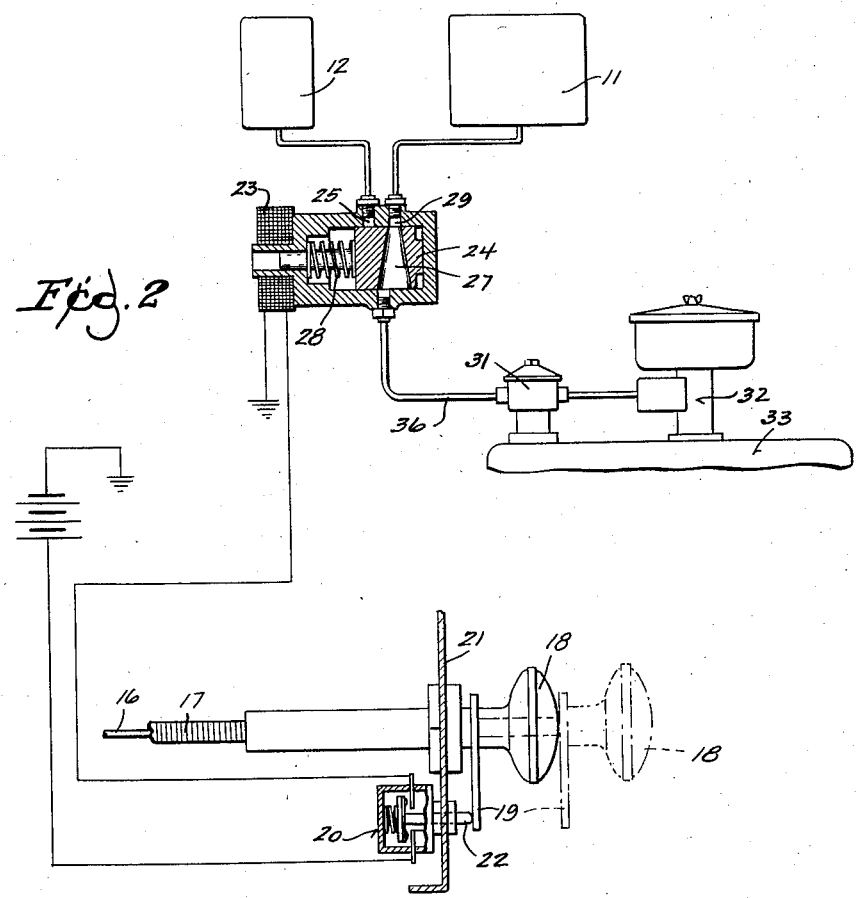
Fig. 2 is a diagrammatic view of the valve and control members with a vertical sectional view of the valve.

Referring more particularly to the drawing, a fuel oil tank truck 10 has the conventional gasoline tank 11 and an auxiliary tank 12. A fuel delivery pump 13 is placed in gear by the movement of lever 14 on the transmission gear box 15, and the lever is manipulated by the flexible pull rod 16 in sleeve 17 and provided with the knob 18. A pressure plate 19 normally keeps switch 20 open when the knob 18 is pressed inwardly against the dash 21. When the knob 18 is pulled outwardly to actuate the oil delivery pump 13, the plate 19 releases the switch button 22 and closes the switch 20 to energize the solenoid 23 moving the slide valve member 24 so that port 25 to the auxiliary tank 12 is registered with port 27 of the slide valve member 24, thus using the gasoline on which refund may be claimed as tax-free. When the knob 18 is returned to normal position against the dash 21, the fuel oil delivery pump 13 will be out of gear and switch 20 will be open, whereupon the coil spring 28 will return slide valve 24 to align port 27 thereof with the port 29 to the main gasoline tank 11, to permit use of the tax paid gasoline through the fuel pump 31 and carburetor 32 into engine 33. In either position of slide valve element 24, the port 27 will communicate with the port 35 to the engine fuel intake line 36.

It will be understood that the device is capable of many modifications in structure and design, without departing from the spirit of the invention, within the scope of the appended claim.

Having thus described the invention, what is claimed and desired to be secured by Letters Patent of the United States, is:

A gasoline driven fuel oil tank truck having a conventional oil delivery pump, a main gasoline tank thereon for fuel to be used in propulsion of the vehicle, an auxiliary tank for use while the delivery pump is in operation, manual means for throwing the oil delivery pump into gear, and switch means associated with said manual means, a diverter valve interconnecting three conduits which lead to the engine of the vehicle, from the main tank and from the auxiliary tank respectively, said valve being normally positioned to supply gasoline from the main tank to the engine of the vehicle, a solenoid arranged to operate said valve, said solenoid being in a circuit including said switch, the arrangement being such that the closing of said switch energizes said solenoid which positions said valve to connect the auxiliary tank with the engine and to disconnect the main tank from the engine whereby the amount of tax free gasoline use may be computed.

References Cited in the file of this patent
UNITED STATES PATENTS

| | | |
|---|---|---|
| 778,784 | Holmok | Dec. 27, 1904 |
| 1,097,950 | Stever | May 26, 1914 |
| 2,522,249 | Baker | Sept. 12, 1950 |
| 2,531,847 | Haley | Nov. 28, 1950 |
| 2,579,979 | Solicito | Dec. 25, 1951 |